US005520443A

United States Patent [19]

Zanzig

[11] Patent Number: 5,520,443

[45] Date of Patent: May 28, 1996

[54] SERIES HYDRAULIC CIRCUIT TAILGATE LOCKING MECHANISM

[75] Inventor: Jerald G. Zanzig, Signal Mountain, Tenn.

[73] Assignee: The Heil Company, Chattanooga, Tenn.

[21] Appl. No.: 334,600

[22] Filed: Nov. 4, 1994

Related U.S. Application Data

[63] Continuation-in-part of Ser. No. 53,907, Apr. 27, 1993, Pat. No. 5,413,402.

[51] Int. Cl.[6] .......... B60P 1/273

[52] U.S. Cl. .......... 298/23 M; 91/520

[58] Field of Search .......... 91/520; 49/395; 292/32, 33, DIG. 23; 298/23 M, 23 S, 23 A, 23 B, 23 F; 105/310.2, 395

[56] References Cited

U.S. PATENT DOCUMENTS

| | | | |
|---|---|---|---|
| 2,558,867 | 7/1951 | May et al. . | |
| 3,111,346 | 11/1963 | Harbers et al. | 298/23 M |
| 3,476,016 | 11/1969 | Dixon et al. | 91/520 |
| 3,873,149 | 3/1975 | Churchman . | |
| 4,068,769 | 1/1978 | Sweet et al. | 298/23 M |
| 4,109,963 | 8/1978 | Sieving et al. | 298/23 M |
| 4,585,172 | 4/1986 | Gazzera | 91/520 X |

FOREIGN PATENT DOCUMENTS

| | | |
|---|---|---|
| 2093902 | 9/1982 | United Kingdom . |

*Primary Examiner*—David A. Bucci
*Assistant Examiner*—Janice L. Krizek
*Attorney, Agent, or Firm*—McAndrews, Held & Malloy, Ltd.

[57] ABSTRACT

A tailgate locking apparatus for a refuse container comprises first and second locking cylinders for locking the tailgate in the closed position. The first and second locking cylinders are movable between a tailgate locked position and a tailgate unlocked position. Each of the first and second locking cylinders comprises a piston assembly disposed within its interior volume. The piston assembly comprises a piston and a piston rod extending from the piston through a central opening in an upper portion of the cylinder. The piston divides the interior volume into a lower chamber and an upper chamber. The upper chamber of the first locking cylinder is fluidly connected to the lower chamber of the second locking cylinder.

5 Claims, 5 Drawing Sheets

SERIES HYDRAULIC CIRCUIT TAILGATE LOCKING MECHANISM

CROSS-REFERENCE TO RELATED APPLICATION

This application is a continuation-in-part of U.S. patent application Ser. No. 08/053,907 filed Apr. 27, 1993, now U.S. Pat. No. 5,413,402 entitled "Sequenced Tailgate Lock." The '907 application, incorporated herein by reference in its entirety, describes a tailgate locking mechanism having two piston-based cylinder assemblies in which the second assembly is configured to move to its tailgate locked position only after the first assembly is moved to its tailgate locked position, and vice-versa.

FIELD OF THE INVENTION

The present invention relates to locking mechanisms, and in particular to a tailgate locking mechanism for a refuse container mounted on a refuse collection vehicle.

BACKGROUND OF THE INVENTION

Refuse collection vehicles with which the present invention is concerned are of the type that include a wheel-supported vehicle chassis, a refuse container body mounted on the vehicle chassis and having an open end, and a tailgate mounted to the body so as to close the open end. Typically, the open end is the rear end of the refuse container body. The tailgate has an upper edge that is pivotally mounted to the top of the container body and can be swung upwardly to uncover the open rear end to allow refuse to be discharged from the container body. Alternatively, the tailgate can be part of a removable container that is capable of being removably mounted on the vehicle chassis, typically using rollers and guide rails.

Locking mechanisms for securing the tailgate in a closed position against the rear end of the body are known in the art. One type of locking mechanism comprises a screw threaded member pivotally mounted on each side of the container body and manually rotated into position with an apertured bracket positioned on each side of the tailgate. This arrangement has the disadvantage of requiring the vehicle operator to manually lock or unlock first one side of the tailgate and then walk around to the other side to perform the locking/unlocking procedure, resulting in a time-consuming and cumbersome procedure.

Another type of locking mechanism is disclosed in U.S. Pat. No. 3,873,149, wherein power actuated rams release the tailgate from the container body and pivot the tailgate first into a raised open position and then down into a locked closed position. Another power actuated locking mechanism is disclosed in British Patent No. GB 2093902, wherein a piston and cylinder assembly acts on a spring loaded plunger to withdraw the plunger from a bracket on the container body to unlock the tailgate.

Although these mechanisms have the advantage of allowing the operator to perform the locking/unlocking procedure from one side of the vehicle by using power controls, the operator must still walk around to the other side of the vehicle to visually check the remote locking cylinder to confirm that the locking cylinder is either in the locked or unlocked position.

One solution to overcome the visual inspection drawback has been to employ multiple sensors to detect the different positions of all the locking cylinders. Such sensors, however, can be subject to mechanical or electrical failure, and increase the cost of the vehicle.

It is, accordingly, an object of the present invention to provide a tailgate locking mechanism that does not require visual inspection of a remote or hidden locking cylinder to determine the locking position.

Another object of the invention is to provide a hydraulic locking mechanism that does not rely upon electrical position sensors.

A further object of the invention is to provide a hydraulic circuit tailgate locking mechanism that operates in series such that the locking position of a second hydraulic latch, which is on the side of the vehicle opposite and not visible to the operator, is known from the locking position of a first latch visible to the operator.

A still further object of the invention is to provide a locking mechanism that is simple, reliable, and cost effective.

SUMMARY OF THE INVENTION

The above and other objects are achieved by a tailgate locking apparatus for a refuse container having an open end. The container has a tailgate mounted thereon for movement between a closed position, wherein the tailgate covers the open end, and an open position, wherein the open end is uncovered. The tailgate locking apparatus comprises first and second locking cylinders for locking the tailgate in the closed position, the first and second locking cylinders being movable between a tailgate locked position and a tailgate unlocked position. Each of the first and second locking cylinders comprises:

(a) a lower end wall, an upper end wall having a central opening formed therein, and a housing interconnecting the lower and upper end walls, the housing and end walls defining an interior volume between the interior surfaces of the housing and end walls;

(b) a piston assembly disposed within the interior volume, the piston assembly comprising a piston and a piston rod extending from the piston through the upper end wall central opening, the piston dividing the interior volume into a lower chamber and an upper chamber.

The upper chamber of the first locking cylinder is fluidly connected to the lower chamber of the second locking cylinder.

When the volume of the upper chamber of the first locking cylinder and the volume of the lower chamber of the second locking cylinders are equal, the piston rod of the second locking cylinder preferably extends from its corresponding piston a distance greater than the piston rod of the first locking cylinder extends from its corresponding piston.

The tailgate locking apparatus preferably further comprises a storage tank for containing hydraulic fluid, a conduit for flowing hydraulic fluid between the storage tank and the lower chamber of the first locking cylinder, a conduit for flowing hydraulic fluid between the upper chamber of the first locking cylinder and the lower chamber of the second locking chamber, a conduit for flowing hydraulic fluid between the upper chamber of the second locking cylinder and the storage tank, and a pump for introducing pressurized hydraulic fluid from the storage tank to at least one of the conduits.

The tailgate locking apparatus preferably further comprises means for engaging the piston rods of the first and second locking cylinders when the piston rods are fully extended from their respective locking cylinders. In the preferred apparatus, the engaging means comprises first and second apertured latch brackets, and the first and second cylinders are positioned such that the piston rods engage one of the first and second apertured latch brackets when the piston rods are fully extended. The first and second apertured latch brackets are each preferably mounted on opposite sides of the refuse container body, and the first and second locking cylinders are each preferably mounted on opposite sides of the tailgate.

DETAILED DESCRIPTION OF THE PREFERRED EMBODIMENTS

Figure 1:
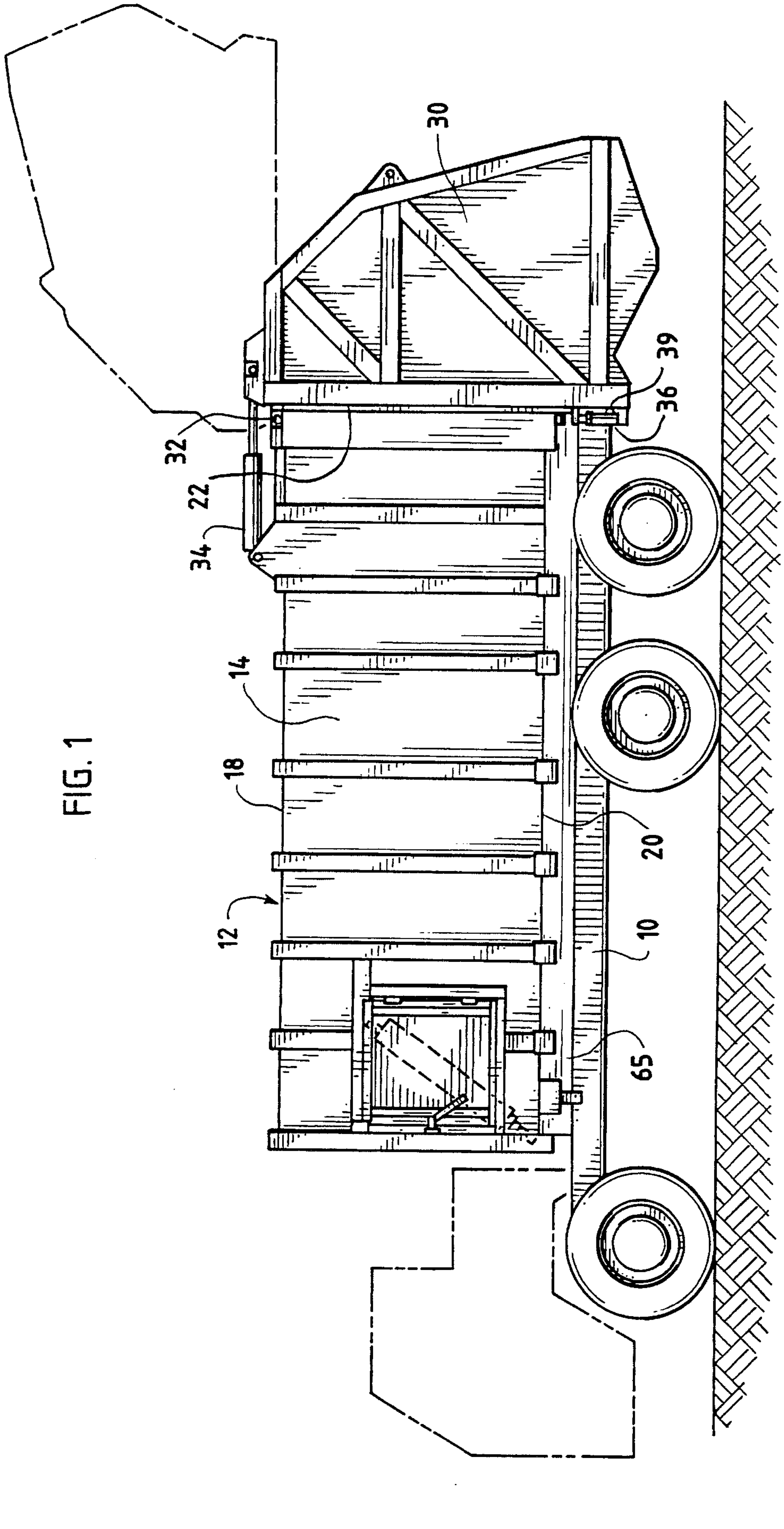
FIG. 1 is a side view of a rear-loading refuse collection vehicle on which the tailgate locking mechanism of the present invention is employed.
Figure 2:
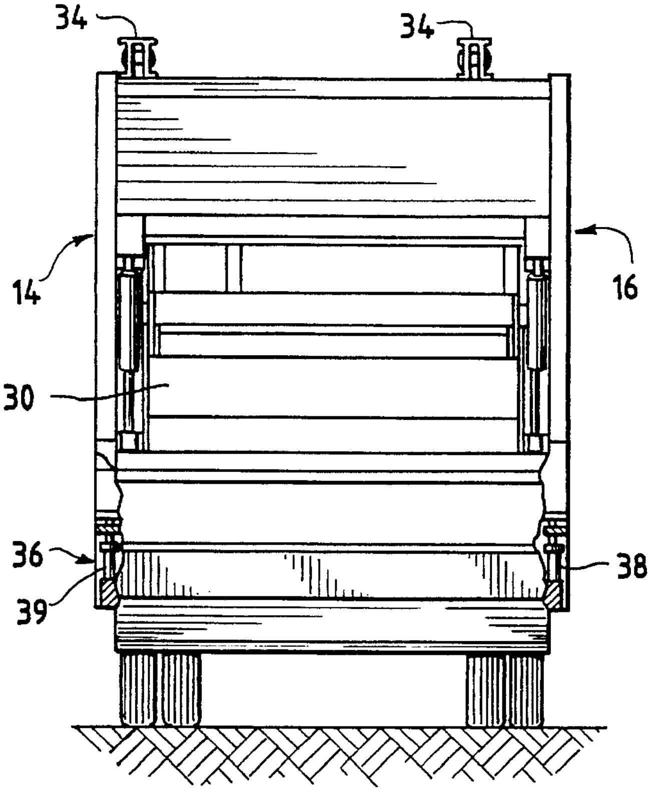
FIG. 2 is a rear view of the rear-loading refuse collection vehicle of FIG. 1, partially cut away to illustrate the tailgate locking mechanism.

Turning first to FIGS. 1 and 2, a rear-loading refuse collection vehicle includes a wheel-supported truck chassis 10 on which is mounted a refuse container body 12. The container body has side walls 14 and 16, a top wall 18, a bottom wall 20, and an open rear end, the periphery of which is shown at 22. Although a rear-loading vehicle is illustrated, it will be appreciated that the present invention can be used with other types of refuse collection vehicles.

A tailgate 30 is mounted on the top wall 18 of the container body by pivotal mountings 32. The pivotal mountings are positioned at the upper edge of the tailgate, with one pivotal mounting being provided at each side of the tailgate. The tailgate is swung upwardly about the pivotal mountings from a closed position, shown in FIG. 1, to a raised or open position, shown in phantom in FIG. 1, by the actuation of a pair of lifting cylinders 34. One end of each lifting cylinder is mounted to the top wall 18 of the container body, while the other end is mounted to the upper end of the tailgate 30. It will be appreciated by those skilled in the art that the tailgate need not be mounted to the top wall of the container, but can be mounted to the container body at other locations, such as the sides of the container body, and by mountings other than pivotal mountings.

To lock the tailgate in the closed position, the refuse collection vehicle is provided with a tailgate locking mechanism 36. The locking mechanism 36 includes a pair of hydraulic locking cylinders 38, 39 mounted adjacent to the rear end of the container body, with one hydraulic locking cylinder being provided at each side of the vehicle. The hydraulic locking cylinders 38, 39 latch the lower end of the tailgate 30 to the rear end of the container body 12 except when the tailgate is specifically released.

The hydraulic locking cylinders 38, 39 are arranged in series. Thus, the remote hydraulic cylinder 38, which is not visible to the vehicle's operator from the vehicle's driver side, is actuated in synchronization with the near-side, visible hydraulic locking cylinder 39.

Figure 3:
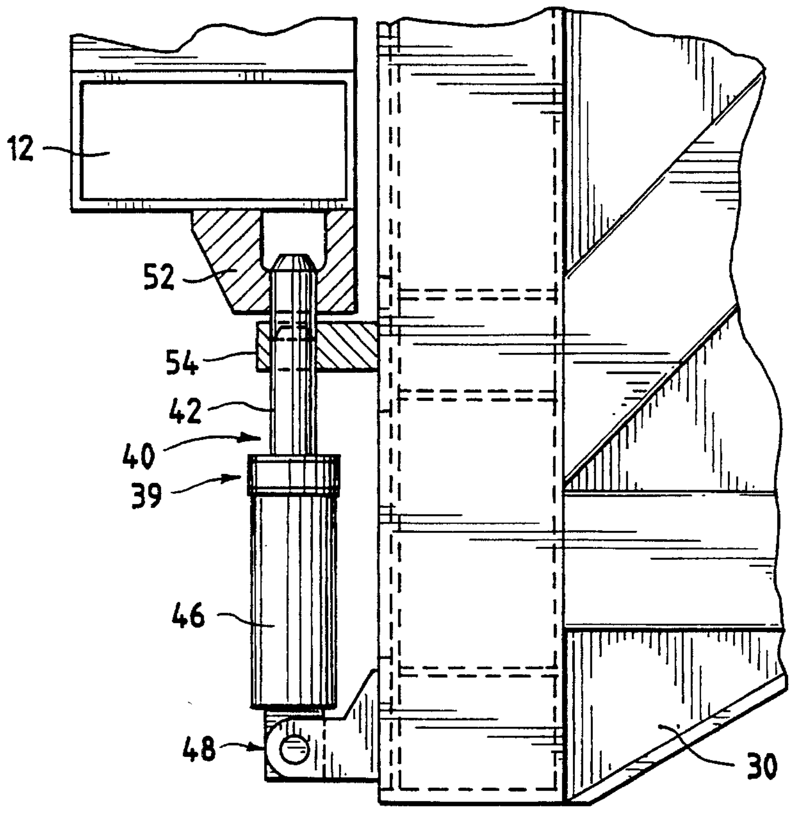
FIG. 3 is a detailed side view of the tailgate locking mechanism.

The locking mechanism of the present invention can be seen in more detail by referring to FIG. 3. Hydraulic locking cylinder 39 includes a piston assembly 40 comprising a piston rod 42 and a piston (not shown in FIG. 3). The piston assembly is disposed within a cylinder 46. Cylinder 46 is mounted, at its non-piston rod end, to the tailgate 30 by a mounting pin and bracket assembly 48. Hydraulic locking cylinder 39 is positioned so that, when piston rod 42 is fully extended, it is engaged with an apertured latch bracket 52, mounted to the bottom wall 20 of the container body 12, to restrain and secure the tailgate 30 to the container body 12. When piston rod 42 is retracted, it is withdrawn from the latch bracket 52, as shown by broken lines in FIG. 3, to unlock the tailgate 30, and permit movement of tailgate 30 from container body 12. An apertured guide bracket 54 is mounted to the tailgate 30 such that, when the tailgate 30 is in the closed position, the guide bracket 54 is positioned just below and in alignment with the latch bracket 52. The guide bracket serves to guide the piston rod 42 into the aperture of the latch bracket 52 when the piston is extended.

Figure 4:
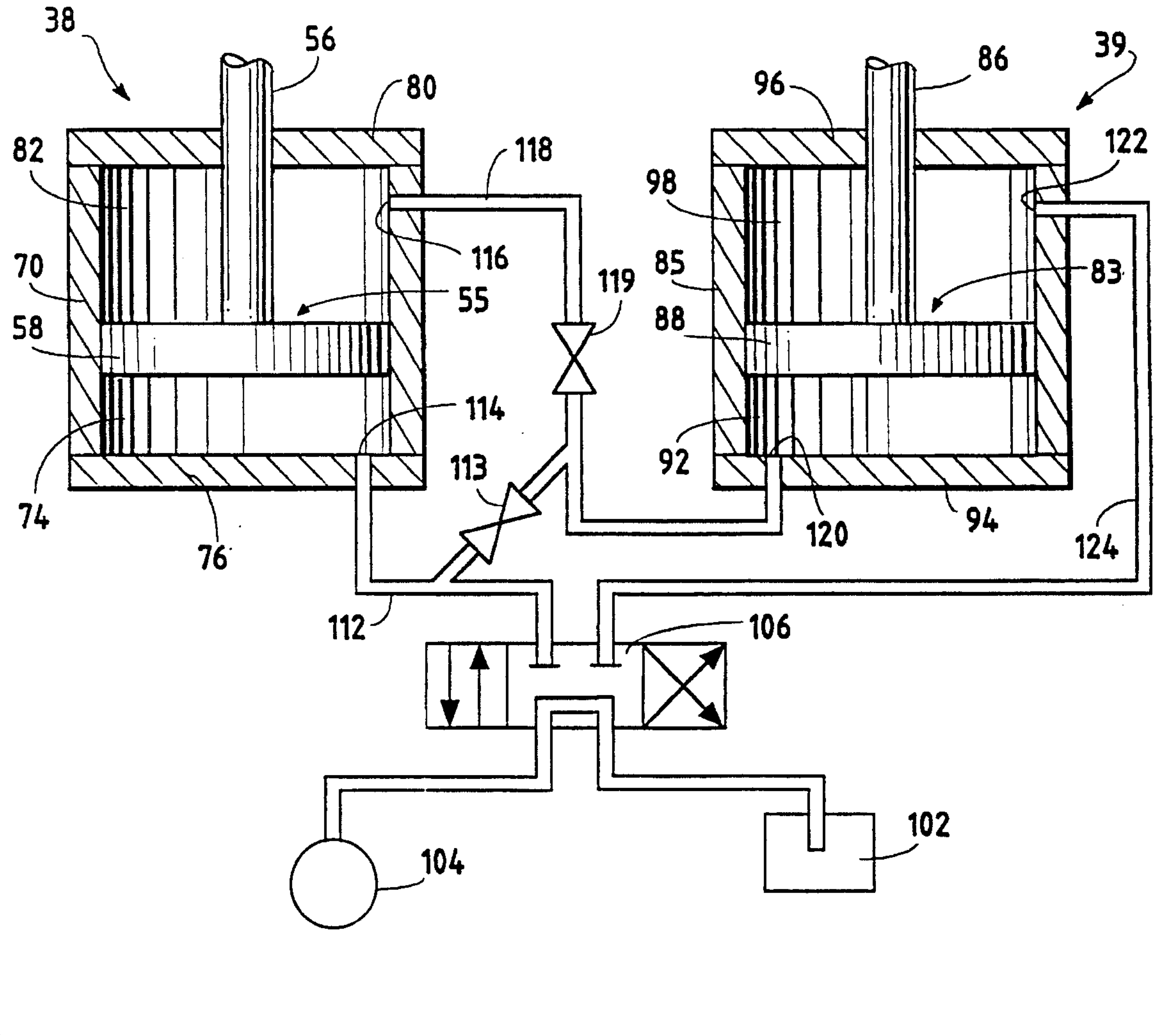
FIG. 4 is a schematic diagram of the tailgate locking mechanism of the present invention showing the locking cylinders arranged in a series hydraulic circuit.

As shown schematically in FIG. 4, the series hydraulic circuit locking mechanism comprises a first hydraulic locking cylinder 38 and a second hydraulic locking cylinder 39, both of which are similar in construction. First locking cylinder 38 includes a piston assembly 55 comprising a piston rod 56 and a piston 58. The piston assembly 55 is disposed within a cylinder 70, which is divided into a lower chamber 74 and an upper chamber 82. The lower chamber 74 is defined, within the cylinder 70, by a lower end wall 76 and the piston 58. The upper chamber 82 is defined, within the cylinder 70, by the piston 58 and an upper end wall 80. Similarly, second hydraulic locking cylinder 39 includes a piston assembly 83 comprising a piston rod 86 and a piston 88. Piston assembly 83 is disposed within a cylinder 85, which is divided into a lower chamber 92 and an upper chamber 98. Lower chamber 92 is defined by a lower end wall 94 and piston 88. Upper chamber 98 is defined by piston 88 and an upper end wall 96.

An on/off valve 113 is disposed between conduit 112 and conduit 118 in order to add sufficient hydraulic fluid to fully extend the piston rods of cylinders 38, 39, and thus restore their synchronization, should the cylinders become out of synchronization. A relief valve 119 is disposed in conduit 118 to exhaust pressurized hydraulic fluid, preferably to storage tank 102, in the event the lower chamber 92 of second locking cylinder 39 is unable to receive hydraulic fluid from the upper chamber 82 of first locking cylinder 38.

The series circuit operation of hydraulic locking cylinders 38 and 39 will now be explained with reference to FIG. 4. In the unlatched position, illustrated in FIG. 4, pistons 58 and 88 of hydraulic locking cylinders 38 and 39, respectively, are adjacent lower end walls 76 and 94, respectively, and upper chambers 82 and 98, respectively, are filled with hydraulic fluid. Hydraulic fluid from a fluid supply tank 102 is directed by a pump 104 through a conventional sliding pilot valve 106 to a first conduit or supply line 112. Sliding pilot valve 106 is controlled by a control means (not shown in FIG. 4), which is remote from the hydraulic locking cylinder assemblies, for example, at the side of, or in the cab of the refuse collection vehicle. First conduit 112 directs hydraulic fluid to a port 114 at the base of first hydraulic locking cylinder 38. Hydraulic fluid passes through port 114 into lower chamber 74, where it accumulates and urges piston 58 away from lower end wall 76 (upwardly toward upper end wall 80 in FIG. 4). As piston 58 is urged upwardly, piston rod 56 moves from the lowered, unlocked position shown in FIG. 4 to the extended, locked position.

As hydraulic fluid accumulates in lower chamber 74, the volume of upper chamber 82 is reduced, and hydraulic fluid previously accumulated in upper chamber 82 is urged out of upper chamber 82 through port 116. Hydraulic fluid exiting upper chamber 82 through port 116 is directed by a second conduit 118 to a port 120 at the lower portion of second hydraulic cylinder 39. Hydraulic fluid passes through port 120 into lower chamber 92, where it accumulates and urges piston 88 away from lower end wall 94 (upwardly toward upper end wall 96 in FIG. 4). As piston 88 is urged upwardly, piston rod 86 moves from the lowered, unlocked position shown in FIG. 4 to the extended, locked position.

As hydraulic fluid accumulates in lower chamber 92, the volume of upper chamber 98 is reduced, and hydraulic fluid previously accumulated in upper chamber 98 is urged out of upper chamber 98 through port 122. Hydraulic fluid exiting upper chamber 98 through port 122 is directed by a third conduit 124 to supply tank 102 via sliding pilot valve 106.

When it is desired to unlatch the hydraulic locking cylinder assemblies, the flow of hydraulic fluid is reversed. Specifically, hydraulic fluid is directed by pump 104 from supply tank 102 through sliding pilot valve 106 to third conduit 124, which directs hydraulic fluid to port 122. Hydraulic fluid passes through port 122 into upper chamber 98 of second hydraulic locking cylinder 39. As hydraulic fluid accumulates in upper chamber 98, piston 88 is urged toward lower end wall 94, and hydraulic fluid is exhausted from lower chamber 92 through port 120. Hydraulic fluid is directed by second conduit 118 to port 116. Hydraulic fluid passes through port 120 into upper chamber 82 of first hydraulic locking cylinder 38. As hydraulic fluid accumulates in upper chamber 82, piston 58 is urged toward lower end wall 76, and hydraulic fluid is exhausted from lower chamber 74 through port 114. Hydraulic fluid is directed by first conduit 112 to supply tank 102 via sliding pilot valve 106.

Figure 5A:
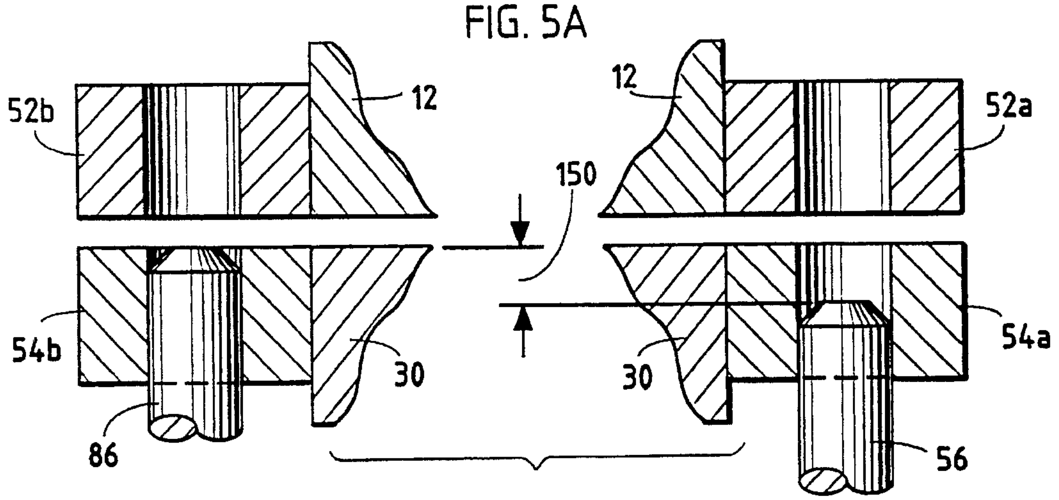
FIGS. 5*a*, 5*b* and 5*c* are schematic diagrams illustrating the relative positions of the piston rods extending from the locking cylinders, when the interior volumes of the first and second locking cylinders are equal, in their unlocked position (FIG. 5*a*), the position in which one piston rod is in the locked position and the other piston rod is in the unlocked position at the instant before assuming its locked position (FIG. 5*b*), and the positions of piston rods in the locked position (FIG. 5*c*).
Figure 5B:
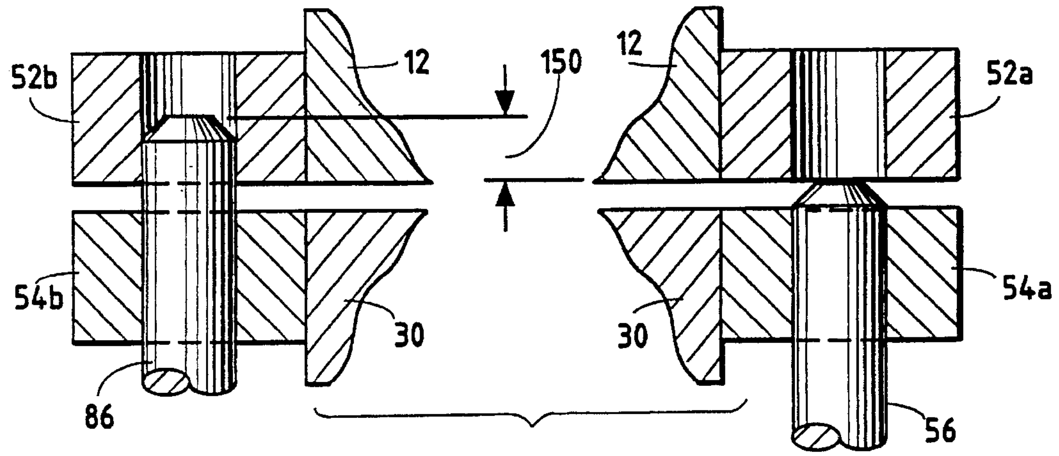
Figure 5C:
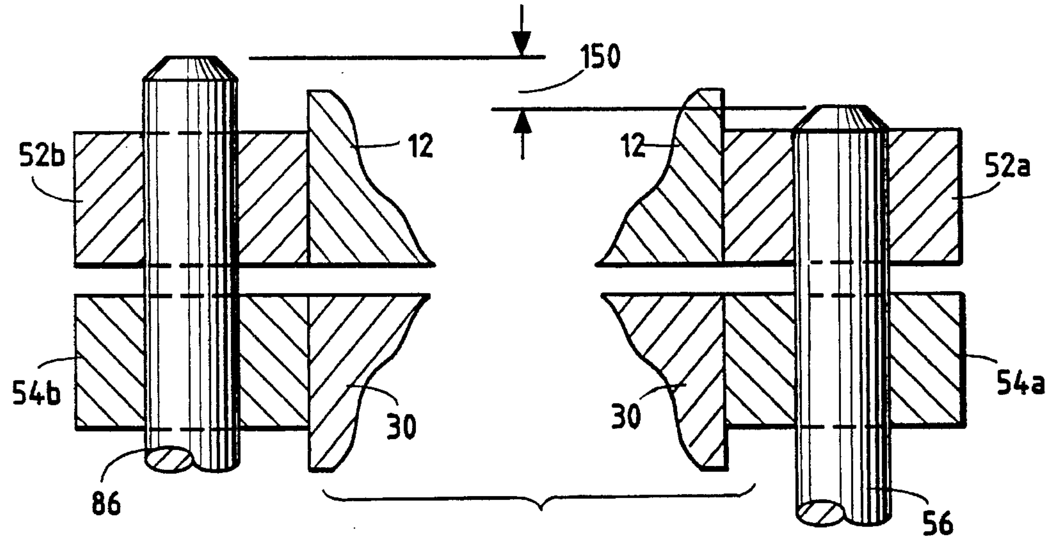

FIGS. 5*a*, 5*b* and 5*c* show the relative positions of the piston rods 56 and 86 when the interior volumes of the first and second locking cylinders are substantially equal. FIG. 5*a* shows the relative positions of piston rods 56 and 86 in their unlocked position. FIG. 5*b* shows the relative positions of piston 86 in the locked position and piston 56 in the unlocked position at the instant before piston 56 assumes its locked position. FIG. 5*c* shows the relative positions of piston rods 56 and 86 in the locked position. In FIGS. 5*a*, 5*b* and 5*c*, refuse container 12 is substantially identical to container 12 in FIG. 3, tailgate 30 is substantially identical to tailgate 30 in FIG. 3, apertured latch brackets 52*a* and 52*b*, located on opposite sides of the refuse vehicle, are substantially identical to apertured latch bracket 52 in FIG. 3, and apertured guide brackets 54*a* and 54*b*, also located on opposite sides of the refuse vehicle, are substantially identical to apertured guide bracket 54 in FIG. 3.

As shown in FIGS. 5*a*, 5*b* and 5C, piston rod 86 extends further than piston rod 56 from its corresponding piston (not shown in FIGS. 5*a*, 5*b* and 5*c*) by a constant distance, indicated in FIGS. 5*a*, 5*b* and 5*c* by the numeral 150. Thus, an operator observing the position of piston rod 56 can readily discern the position of piston rod 86, since both piston rods move essentially synchronously because of their series hydraulic circuit arrangement. The series circuit arrangement thus eliminates the need to visibly inspect the remote locking cylinder, and eliminates the need for electronic sensors to detect the position of the remote locking cylinder.

Figure 6:
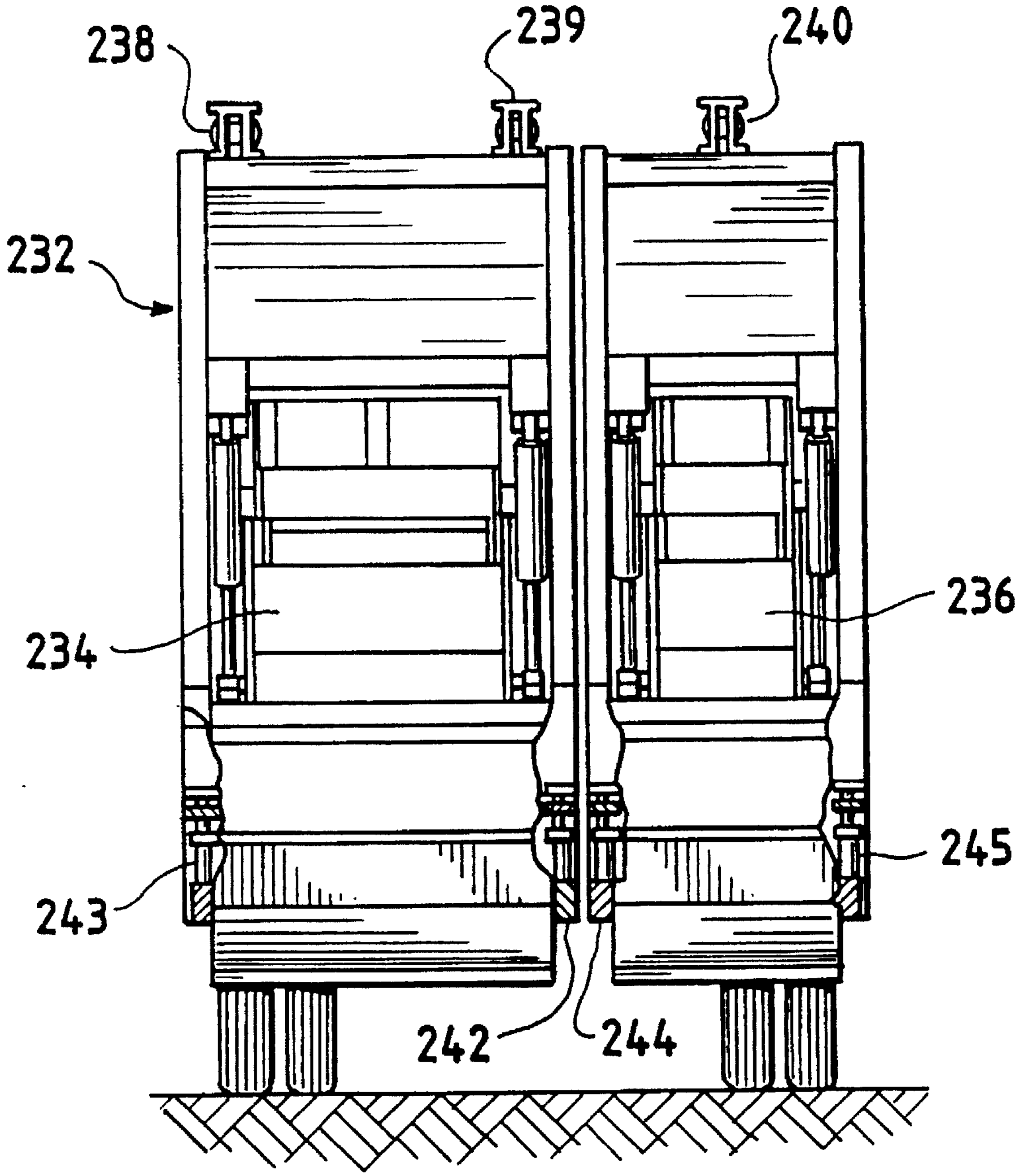
FIG. 6 is a rear view of an alternative refuse collection vehicle, partially cut away to illustrate an alternative embodiment of the present invention.

FIG. 6 shows the rear of a refuse vehicle, which is similar to the refuse vehicle of FIG. 1, except the refuse container body 232 has a vertical divider (not shown) which divides the container body into left and right body compartments. A left and a right tailgate 234, 236, respectively, for closing the open rear ends of the left and right body compartments respectively, are pivotally mounted to the top wall of the container body 232. The tailgates are swung upwardly about their pivotal mountings from a closed position, shown in FIG. 6, to a raised or open position. The left tailgate 234 is raised and lowered by the actuation of a pair of lifting cylinders 238, 239, while the actuation of a single lifting cylinder 240 raises the right tailgate 236.

Each of the tailgates 234 and 236 is locked in the closed position by a tailgate locking mechanism like that described in connection with FIGS. 1–4, 5*a*, 5*b* and 5*c*. Inner and outer hydraulic locking cylinders 242 and 243, respectively, are provided adjacent the inner and outer sides, respectively, of the tailgate 234, while inner and outer hydraulic locking cylinders 244 and 245, respectively, are provided adjacent the inner and outer sides, respectively, of the tailgate 236. Because the inner hydraulic locking cylinders 242 and 244 are hidden from view when the tailgates 234 and 236 are closed, it is virtually impossible to see whether the inner cylinders are locked or unlocked.

Preferably, the inner and outer locking cylinders 242 and 243 for the tailgate 234 are operated on one hydraulic circuit, while the inner and outer locking cylinders 244, 245 for the tailgate 236 are operated on a second, independent hydraulic circuit. Alternatively, the hydraulic locking cylinders may be operated on the same hydraulic circuit and are fluidly connected in series. When a single circuit is employed, hydraulic fluid from the upper chamber of each hydraulic locking cylinder assembly is directed to the lower chamber of the next hydraulic locking cylinder assembly in the series, with hydraulic fluid from the upper chamber of the last hydraulic locking cylinder of the series being directed to a storage tank. In addition, piston rods of the remote hydraulic locking cylinders, which are normally out of view of the vehicle operator, are constructed so as to extend a constant distance further from their corresponding pistons than the piston rods of the near-side locking cylinders in view of the vehicle operator.

Thus, the present invention provides a simple and effective mechanism for locking the tailgate to the body of a refuse vehicle, without the need to inspect the remote or hidden locking cylinder or to employ multiple sensors to determine the locking position. The locking mechanism disclosed herein may be embodied in other specific forms without departing from the spirit or central characteristics thereof. For example, although the hydraulic locking cylinders illustrated in FIGS. 1–6 are mounted vertically with respect to the refuse container and vehicle, the hydraulic locking cylinders can also be mounted horizontally. When mounted horizontally, the upper and lower components would become components oriented right and left. Further it may be desirable to employ three hydraulic locking cylinders, rather than two, for the single tailgate illustrated in FIGS. 1 and 2. When three hydraulic locking cylinders are employed, the cylinders are preferably mounted adjacent the rear end of the container body with one cylinder at each side of the body and one cylinder in the middle. It may be further desirable to employ four or more hydraulic locking cylinders arranged in series.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A tailgate locking apparatus for a refuse container having an open end, the container having a tailgate mounted thereon for movement between a closed position, wherein the tailgate covers the open end, and an open position, wherein the open end is uncovered, the tailgate locking apparatus comprising first and second locking cylinders for locking the tailgate in the closed position, said first and second locking cylinders being movable between a tailgate locked position and a tailgate unlocked position, each of said first and second locking cylinders comprising:

(a) a lower end wall, an upper end wall having a central opening formed therein, and a housing interconnecting said lower and upper end walls, said housing and end walls defining an interior volume between the interior surfaces of the housing and end walls;

(b) a piston assembly disposed within said interior volume, said piston assembly comprising a piston and a piston rod extending from said piston through said upper end wall central opening, said piston dividing said interior volume into a lower chamber and an upper chamber;

wherein the upper chamber of said first locking cylinder is fluidly connected to the lower chamber of said second locking cylinder, wherein the volume of the upper chamber of said first locking cylinder and the volume of the lower chamber of the second locking cylinder are equal, and wherein the piston rod of the second locking cylinder extends from its corresponding piston a distance greater than the piston rod of the first locking cylinder extends from its corresponding piston.

2. The tailgate locking apparatus of claim 1 further comprising a storage tank containing hydraulic fluid, a conduit for flowing hydraulic fluid between said storage tank and the lower chamber of said first locking cylinder, a conduit for flowing hydraulic fluid between the upper chamber of said first locking cylinder and the lower chamber of said second locking chamber, a conduit for flowing hydraulic fluid between the upper chamber of said second locking cylinder and said storage tank, and a pump for introducing pressurized hydraulic fluid to at least one of said conduits.

3. The tailgate locking apparatus of claim 1 further comprising means for engaging the piston rods of said first and second locking cylinders when said piston rods are fully extended from their respective locking cylinders.

4. The tailgate locking apparatus of claim 3 wherein said engaging means comprises first and second apertured latch brackets, and wherein said first and second cylinders are positioned such that said piston rods engage one of said first and second apertured latch brackets when said piston rods are fully extended.

5. The tailgate locking apparatus of claim 4 wherein a respective one of said first and second apertured latch brackets is mounted on opposite sides of the refuse container body, and a respective one of the first and second locking cylinders is mounted on opposite sides of said tailgate.

* * * * *